Patented June 7, 1932

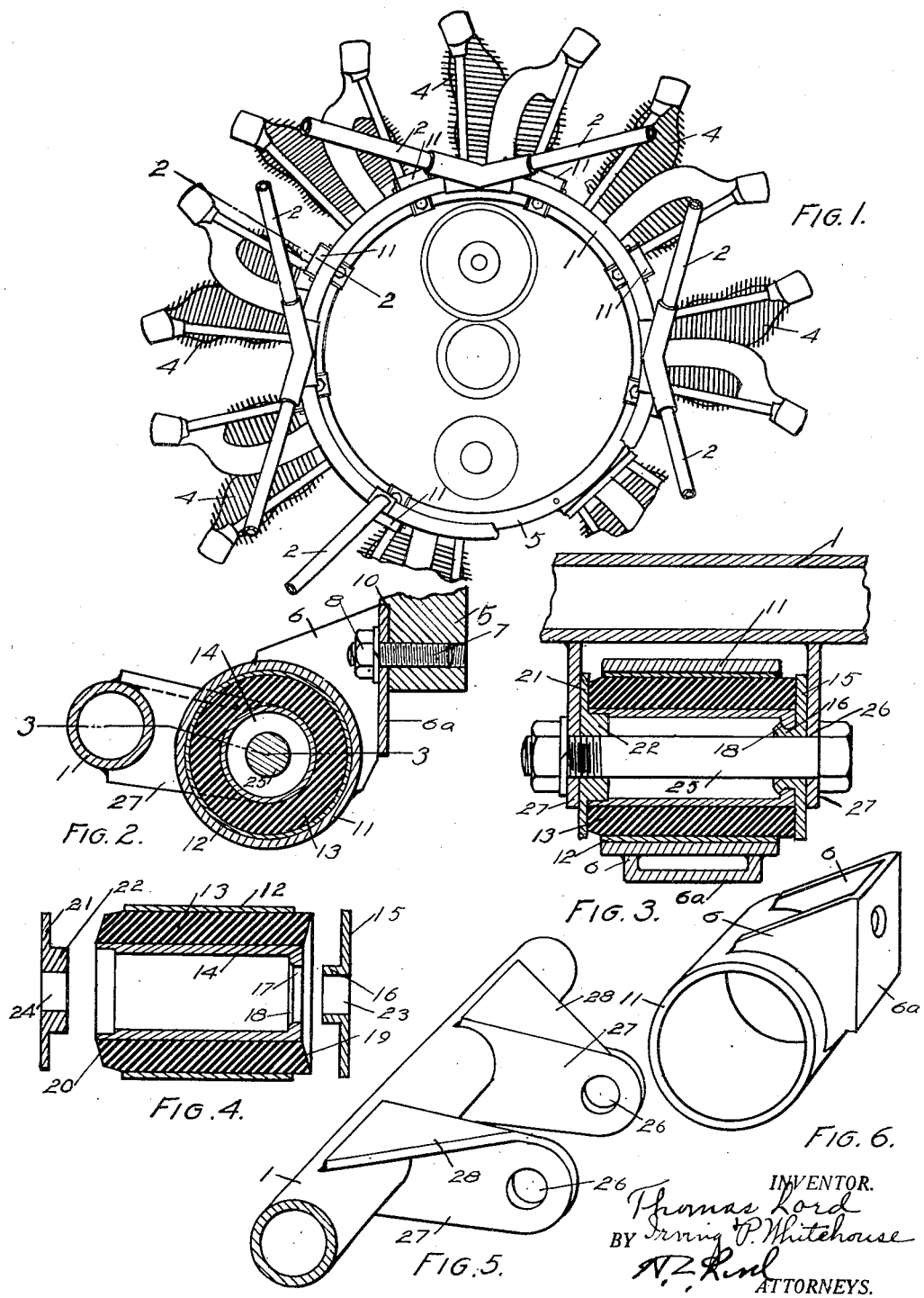

1,862,484

UNITED STATES PATENT OFFICE

THOMAS LORD AND IRVING P. WHITEHOUSE, OF ERIE, PENNSYLVANIA, ASSIGNORS TO HUGH C. LORD, OF ERIE, PENNSYLVANIA

MOUNTING

Application filed May 14, 1929. Serial No. 363,070.

With many instruments which are subjected to periodic vibrations incident to torque impulses it is desirable to dampen these impulses and at the same time provide means for supporting the instrument and taking care of what other thrusts may be involved. Such a situation is exemplified in the aeroplane motor. Here the torque thrusts are very large in comparison with the gravity load and the direct pull. In order to dampen torque thrusts we interpose between the engine and the frame a dampening means comprising preferably a series of rubber bushings, these bushings being arranged with their axes tangent to a circle about the torque center. In this way the several bushings may be made to support the torque thrusts through the rubber in shear which is quite yielding as compared to resistance in a radial direction on the bushings. The pull of the motor with the bushings in this arrangement is all received through a radial strain on the rubber and the major portion of the gravity thrusts is also so sustained. Thus the motor as a whole has vibratory freedom in a limited range rotatively but while yieldingly connected is more rigidly sustained as to other movements. It is also desirable to limit the free vibratory movement within fairly close limits and also to provide the mountings in such shape that they may be readily inserted into place as the engine is mounted. The present invention is directed to such a mounting. Features and details of the structure will appear from the specification and claims.

A preferred embodiment of the invention is illustrated in the accompanying drawing as follows:—

Fig. 1 shows a rear view of the motor with a portion of the aeroplane frame carrying the engine supporting ring.

Fig. 2 is a section on the line 2—2 in Fig. 1.

Fig. 3 is a section on the line 3—3 in Fig. 2.

Fig. 4 is a central section of the mounting with the parts prior to the assembly of the end plates.

Fig. 5 is a perspective view of one of the mounting carrying brackets.

Fig. 6 is a similar view of the bracket carrying the other member of the mounting.

1 marks the engine carrying ring. This is of common construction and supported by struts 2 extending from the aeroplane frame. The engine has cylinders 4 radially arranged and carried by a frame 5, this frame corresponding to in general outline and opposing the ring 1.

Mounting brackets are secured to the engine frame. These have ears 6 with connecting plates 6a. Studs 7 extend into the frame and through the plates 6a where they are secured by nuts 8. The frame has the overhanging shoulder 10 which locks the bracket against turning on the frame.

A mounting sleeve 11 is arranged between the ears 6 and is secured to the ears 6 preferably by welding.

The mountings are provided with shells 12 which are pressed into the sleeves 11. These mountings have rubber bushings 13 and inner hollow pins 14. The rubber bushings are preferably secured to the shells and pins by surface bonding and this is preferably accomplished during vulcanization so that as the rubber cools it shrinks and puts the rubber under radial tension. The rubber is given a certain amount of stability but has, under these circumstances, such freedom for incipient motion as to be very effective in absorbing periodic vibrations. A plate 15 is provided with an extension 16. This extension is forced into an opening 17 in the end of the pin 14 and headed over on a shoulder 18. The rubber extends from the shell 12 and at one end has a concave face 19 while at the opposite, or thrust end, the rubber has an extension with a conical surface 20. These extensions and this taper of the faces 19 and 20 are formed with relation to the normal running load thrust to which the mounting is subjected. When the plate 15 is forced to place the outer edge of this plate engaging the outer periphery of the face 19 forces the rubber in shear pulling the pin 14 toward the right in Fig. 4 and forcing the shell 12 toward the left. In the ultimate result the tapered surface 20 is brought into initial contact with a plate 21. This plate is provided with a projection 22 which is forced into the end of the shell 14. In this position the rubber is initially stressed axially, or in shear to approximately the normal torque load on the joint as it is arranged in the frame with the small rubber extensions in initial contact with the plates 15 and 20. With the rubber in this position the extensions are simply neutral, it being understood that as the thrust load is placed on the shell the thrust of the face 19 on the plate 15 is relieved. Thus in the normal running and when subjected to the normal periodic vibration the rubber extensions are in neutral and thus offer practically no initial resistance to the endwise or vibratory action on the joint. But where an abnormal thrust takes place as in idling these extensions and their direct contact on the plates 15 and 20 build up a resistance very abruptly so that while there is vibratory freedom in the normal vibration range there is a very abrupt limitation of this vibratory freedom due to these extensions.

The plate 15 has a central opening 23 and the plate 21 the central opening 24. Bolts 25 extend through these openings and through openings 26 in ears 27. These ears 27 are formed of plates welded to the supporting ring 1. They are preferably provided with bracing webs 28 extending from the ears, the rear edges of these plates being likewise welded to the ring 1.

As the plate 15 is forced to position it shortens the joint to its normal, or load condition, so that when these units are put in place the plates 15 and 20 will be so spaced apart that they will readily slip between the ears 27 and thus permit of the ready assembly of the engine in place.

It will be observed that by placing these mountings with their axes around the circle they all receive the torque thrust in an axial direction and are, therefore, very sensitive as to this resulting in placing the rubber in shear. The landing thrusts, or gravity thrusts are mostly sustained by rubber under direct radial strain and the pull from the motor is all sustained by the rubber under stress in a radial direction. The resistance to movement of the rubber in these mountings is several times greater in a radial direction relatively to the axis of the mounting than in an axial or shear direction of the mounting. As shown there are eight mountings sustaining the thrusts, each having attaching parts connected to the members. The two lower and two upper mountings sustain a very large proportion of the gravity thrusts of the motor. The four side mountings are just as effective in sustaining the torsional and axial thrusts as are the upper and lower mountings. The upper and lower mountings, therefore, carry the load and perform their share in sustaining the torque thrusts. The side mountings supplement the top and bottom mountings in sustaining through shear the torque thrust, but have comparatively little effect in sustaining the gravity load.

What we claim as new is:—

1. The combination with an instrument subjected to periodic torque vibrations and its support of means interposed between the instrument and the support comprising a series of mountings comprising rubber bushings sustaining torque thrusts on the mountings in an axial direction with the rubber in shear relation and the major portion of other thrusts with a radial stress on the bushings.

2. The combination with an instrument subjected to periodic torque vibrations and its support of means interposed between the instrument and the support comprising a series of mountings comprising rubber bushings sustaining torque thrusts on the mountings in an axial direction with the rubber in shear relation and the major portion of other thrusts with a radial stress on the bushings, the rubber of said bushings being under initial radial tension.

3. The combination with an instrument subjected to periodic torque vibrations and its support of means interposed between the instrument and the support comprising a series of mountings comprising rubber bushings sustaining torque thrusts on the mountings in an axial direction with the rubber in shear relation and the major portion of other thrusts with a radial stress on the bushings, the rubber of said bushings being under initial radial tension; extensions on the bushings; and means operating directly on the extensions limiting the movement of the bushings.

4. The combination with an instrument subjected to periodic torque vibrations and its support of means interposed between the instrument and its support comprising a series of rubber bushings set with their axes at an angle to each other and tangent to arcs centered on the torque axis.

5. The combination with an instrument subjected to periodic torque vibrations and its support of means interposed between the instrument and its support comprising a series of rubber bushings set with their axes at an angle to each other and tangent to arcs centered on the torque axis, said bushings being under initial radial tension.

6. The combination with an instrument subjected to periodic torque vibrations and its support of means interposed between the instrument and its support comprising a series of rubber bushings set with their axes at an angle to each other and tangent to arcs centered on the torque axis, and extensions on said bushings limiting the axial movement against abnormal thrust.

7. In an engine mounting, the combination of a ring support; an engine frame opposing the support; means interposed between the ring support and engine comprising a series of rubber bushings extending in sequence around the circle and having their axes tangent with the circle; and means for securing said bushings to the ring support and engine frame in position to subject the bushings to shearing strain under the thrust of the motor.

8. In an engine mounting, the combination of a ring support; an engine frame opposing the support; means interposed between the ring support and engine frame comprising a series of rubber bushings extending in sequence around the circle and having their axes tangent with the circle; and means for securing said bushings to the ring support and engine frame in position to subject the bushings to shearing strain under the thrust of the motor, said bushings having extensions limiting the relative movement under abnormal thrusts.

9. In an engine mounting, for aeroplanes, the combination of an engine supporting ring; an engine frame; a series of complementary brackets on the engine frame and ring, one bracket comprising a sleeve for receiving a mounting and the other ears for engaging the central member of the mounting; mountings arranged in the sleeves comprising an outer shell, an inner member secured to the ears and a rubber bushing between the shell and inner member, said rubber bushing having extensions, one end having a tapered thrust wall; and end plates on the mounting placing the rubber under initial stress in a shearing direction, said plates being arranged within the ears of the brackets.

10. A mounting comprising an outer shell, an inner member, a rubber bushing bridging the space between the members, said bushing extending beyond the shell, and means holding the rubber under initial shear stresses in an axial direction.

11. A mounting comprising an outer shell, an inner member, a rubber bushing bridging the space between the members, said bushing extending beyond the shell, and a plate secured to the inner member and placing the rubber under initial shear stresses in an axial direction.

12. A mounting comprising a shell; a hollow pin having an internal shoulder at one end; a rubber bushing bridging the space between the shell and pin; and a plate having a projection extending into an internal shoulder and secured therewith, said plate forcing the rubber with an initial axial shear.

13. The combination with an instrument subjected to periodic torque vibrations and its support of means interposed between the instrument and its support comprising a series of rubber bushings set with their axes at an angle to the horizontal and tangent to arcs centered on the torque axis.

14. The combination with an instrument subjected to periodic torque vibrations and its support of means interposed between the instrument and its support comprising a series of rubber bushings set with their axes at an angle to the horizontal and tangent to arcs centered on the torque axis, said bushings being under initial radial tension.

15. The combination of means mounting a member having rotating parts, subjecting the member to torque-induced vibrations, a supporting member for the vibrating member, said members having attaching parts, and rubber cushioning means disposed between the attaching parts and secured with relation to one member at least by bonding, the rubber means being so disposed between the parts that the major portion of the torque movement of the torque vibrated member is yieldingly accommodated by a shear stress of the rubber and the major portion of the gravity thrust is taken through direct non-shear stress of the rubber.

16. The combination of means mounting a member having rotating parts, subjecting the member to torque-induced vibrations, a supporting member for the vibrating member, said members having attaching parts, and rubber cushioning means disposed between the attaching parts and bonded to the attaching parts of both members, the rubber means being so disposed between the parts that the major portion of the torque movement of the torque vibrated member is yieldingly accommodated by a shear stress of the rubber and the major portion of the gravity thrust is taken through direct non-shear stress of the rubber.

17. The combination of means mounting a member having rotating parts, subjecting the member to torque-induced vibrations, a supporting member for the vibrating member, said members having attaching parts, and rubber cushioning means having a plurality of cushion units disposed between the attaching parts and secured with relation to one of the members at least by bonding, the rubber of said units being so disposed between the parts that the major portion of the torque movement of the torque vibrated member is yieldingly accommodated by a shear stress of the rubber and the major portion of the gravity thrust is taken through direct non-shear stress of the rubber.

18. The combination of means mounting a member having rotating parts, subjecting the member to torque-induced vibrations, a supporting member for the vibrating member, said members having attaching parts, and rubber cushioning means disposed between the attaching parts and secured with relation to one member at least by bonding, the rubber means being so disposed between the parts that the major portion of the torque movement of the torque vibrated member is yieldingly accommodated by a shear stress of the rubber and the major portion of the gravity and axial thrust is taken through direct non-shear stress of the rubber.

19. The combination of means mounting a member having rotating parts, subjecting the member to torque-induced vibrations, a supporting member for the vibrating member, said members having attaching parts, rubber cushioning means disposed between the attaching parts and secured with relation to one member at least by bonding, the rubber means being so disposed between the parts that the major portion of the torque movement of the torque vibrated member is yieldingly accommodated by a shear stress of the rubber and the major portion of the gravity thrust is taken through direct non-shear stress of the rubber, and means supplementing the shear resistance of the rubber in sustaining the torque thrusts.

20. The combination of means mounting a member having rotating parts, subjecting the member to torque-induced vibrations, a supporting member for the vibrating member, said members having attaching parts, rubber cushioning means disposed between the attaching parts and secured with relation to one member at least by bonding, the rubber means being so disposed between the parts that the major portion of the torque movement of the torque vibrated member is yieldingly accommodated by a shear stress of the rubber and the major portion of the gravity thrust is taken through direct non-shear stress of the rubber, and means supplementing the shear resistance of the rubber in sustaining the torque thrusts comprising rubber exerting resistance to torque thrusts through shear stress of the rubber.

21. The combination of means mounting a member having rotating parts, subjecting the member to torque-induced vibrations, a supporting member for the vibrating member, said members having attaching parts, a rubber cushioning means disposed between the attaching parts and secured with relation to one member at least by bonding, the rubber means being so disposed between the parts that the major portion of the torque movement of the torque vibrated member is yieldingly accommodated by a shear stress of the rubber and the major portion of the gravity thrust is taken through direct non-shear stress of the rubber, said rubber affording a free torsional vibration movement of the torque-vibrated member through a normal range, and means acting on the rubber interposing resistance to the movement of the rubber beyond the normal vibration range.

22. The combination of means mounting a member having rotating parts, subjecting the member to torque-induced vibrations, a supporting member for the vibrating member, said members having attaching parts, and rubber cushioning means disposed between the attaching parts and secured with relation to one member at least by bonding, the rubber means being so disposed between the parts that the major portion of the torque movement of the torque vibrated member is yieldingly accommodated by a shear stress of the rubber and a major portion of the gravity thrust is taken through a different stress of the rubber.

In testimony whereof we have hereunto set our hands.

THOMAS LORD.
IRVING P. WHITEHOUSE.